United States Patent [19]
Lockwood

[11] Patent Number: 6,139,727
[45] Date of Patent: Oct. 31, 2000

[54] SELF-CLEANING WATER FILTER

[75] Inventor: George H. Lockwood, Pompano Beach, Fla.

[73] Assignee: Anthony Mfg. Corp., Azusa, Calif.

[21] Appl. No.: 09/260,690

[22] Filed: Mar. 2, 1999

[51] Int. Cl.[7] .............................. B01D 29/66; B01D 35/12
[52] U.S. Cl. ......................... 210/107; 210/108; 210/116; 210/335; 210/411; 210/427
[58] Field of Search ..................... 210/106–109, 210/111, 116, 134, 312, 335, 411, 427

[56] References Cited

U.S. PATENT DOCUMENTS

2,237,964 4/1941 Haught .................................. 210/108

Primary Examiner—Matthew O. Savage
Attorney, Agent, or Firm—Kelly Bauersfeld Lowry & Kelley, LLP

[57] ABSTRACT

A self-cleaning filter is provided for filtering particulate from a fluid flow stream such as water used in an irrigation system or the like, wherein a segmented filter element is backwashed or flushed clean in response to cyclic on-off supply of fluid. The self-cleaning filter comprises a filter housing having inlet and outlet fittings for in-line connection along a water supply conduit at a location downstream from a system on-off valve. The segmented filter element is supported within the filter housing, with a first filter segment aligned with an inlet port for filtering water. When the water supply is turned on, filtered water passing through the first filter segment initially backwashes through a second filter segment with increasing line pressure to flush prior-collected particulate thereon through a flush port. When the line pressure reaches a predetermined level, a normally open and pressure responsive flush valve closes the flush port. Thereafter, with further increased line pressure, a pressure responsive outlet valve opens an outlet port to permit flow of filtered water through the housing outlet fitting. When the water supply is turned off, a pressure responsive index mechanism rotates the filter element for reversing the positions of the first and second filter segments relative to the inlet and flush ports, so that water is filtered by the second filter segment and particulate is flushed from the first filter segment when the water supply is next turned on.

26 Claims, 6 Drawing Sheets

SELF-CLEANING WATER FILTER

BACKGROUND OF THE INVENTION

This invention relates generally to filter devices for filtering particulate from a fluid flow stream such as a water supply for use in an irrigation system. More particularly, this invention relates to an improved filter device of the type having a filter element adapted for automatic backwashing or flushing of accumulated particulate therefrom in response to cyclic on-off supply of the fluid flow stream.

Water filters are used in a wide range of different applications to collect and remove particulate matter from a water flow stream. In one specific application, water filters are employed in irrigation systems to filter out fine particulate and debris which may be present in a water supply, to prevent such particulate from passing to sprinkler heads or to low flow emitter devices where it can obstruct or otherwise interfere with the delivery of irrigation water at selected rates to surrounding vegetation. Such filters have typically included a filter medium designed to collect particulate of a target fine mesh size, wherein the pressure drop across the filter medium is directly proportional to the quantity of particulate collected thereon. Since an excessive pressure drop across the filter medium can significantly reduce water flow and thereby adversely impact the performance of the irrigation system, the filter medium must be periodically changed or appropriately backwashed or flushed to clean the accumulated particulate therefrom.

In the past, changing or cleaning of the filter medium has generally required manual intervention to access and expose the filter medium. Alternately, backwash flow valves and the like have been provided for manual operation to flush water in a reverse direction through the filter medium to flush collected particulate to a waste or drain site. Attempts to automate this process, such as by operating backwash devices in response to detected pressure drop across the filter medium, have been relatively complicated in design and operation and thus have not met with any significant degree of commercial acceptance.

There exists, therefore, a continuing need for further improvements in and to fluid filter devices of the type having a filter medium or filter element adapted for automated self-cleaning operation in a relatively simple and reliable manner. The present invention fulfills these needs and provides further related advantages.

SUMMARY OF THE INVENTION

In accordance with the invention, a self-cleaning filter is provided for use in an irrigation system or the like to filter particulate from a fluid flow stream such as water supply. The improved filter includes a filter element having multiple filter segments adapted for automated backwashing or flushing in response to cyclic on-off supply of water. More particularly, when the water supply is turned on, at least one segment of the filter element is aligned with an inlet port to filter the water, and at least one other segment of the filter element is aligned with a flush port for backwash removal of particulate collected thereon. When the water supply is turned off, the filter element is positionally indexed to change the positions of the filter segments relative to the inlet and flush ports.

In the preferred form, the self-cleaning filter comprises a compact filter housing defining an inlet fitting and an outlet fitting for in-line connection with a water supply conduit at a location downstream from a system on-off control valve. The filter element comprises a rotatable disk mounted at one side of a filter chamber formed within the housing, with at least one and preferably a pair of first filter segments aligned with associated inlet ports for filtering water flowing from the inlet fitting to the filter chamber. The filter chamber in turn communicates through at least one and preferably a pair of second filter segments aligned with flush ports in flow communication with a flush passage having a normally open pressure responsive flush valve mounted therein. The filter chamber also communicates with the outlet fitting via at least one outlet port in flow communication with an outlet passage having a normally closed pressure responsive outlet valve mounted therein.

When the system on-off valve is opened to initiate water flow through the filter, water is filtered upon passage through the inlet ports and the first filter segments aligned therewith to the filter chamber. Initially, the filtered water backwashes through second filter segments to dislodge particulate thereon and to flush such particulate through the flush ports. When the pressure level increases to a predetermined threshold, the flush valve closes. Further increase in the pressure level is effective to open the outlet valve and permit flow of filtered water through the outlet port to the outlet fitting.

An index mechanism is carried by the filter housing and includes a pressure responsive actuator for displacing the filter element relative to the inlet and flush ports in response to cyclic on-off supply of water. In the preferred form, the index mechanism comprises a one-way ratchet clutch including the pressure responsive actuator for retracting the clutch without displacing the filter element in response to increased water pressure within the filter chamber when the water supply is turned on, and for advancing the clutch when water pressure in the filter chamber is relieved by turning off the water supply. Advanced movement of the clutch rotates the filter element sufficiently to reverse the positions of the first and second filter segments relative to the inlet and flush ports. Accordingly, the next time the water supply is turned on, the water is filtered by the second filter segments and particulate collected previously on the first filter segments is backwashed to the flush ports.

Other features and advantages of the present invention will be more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
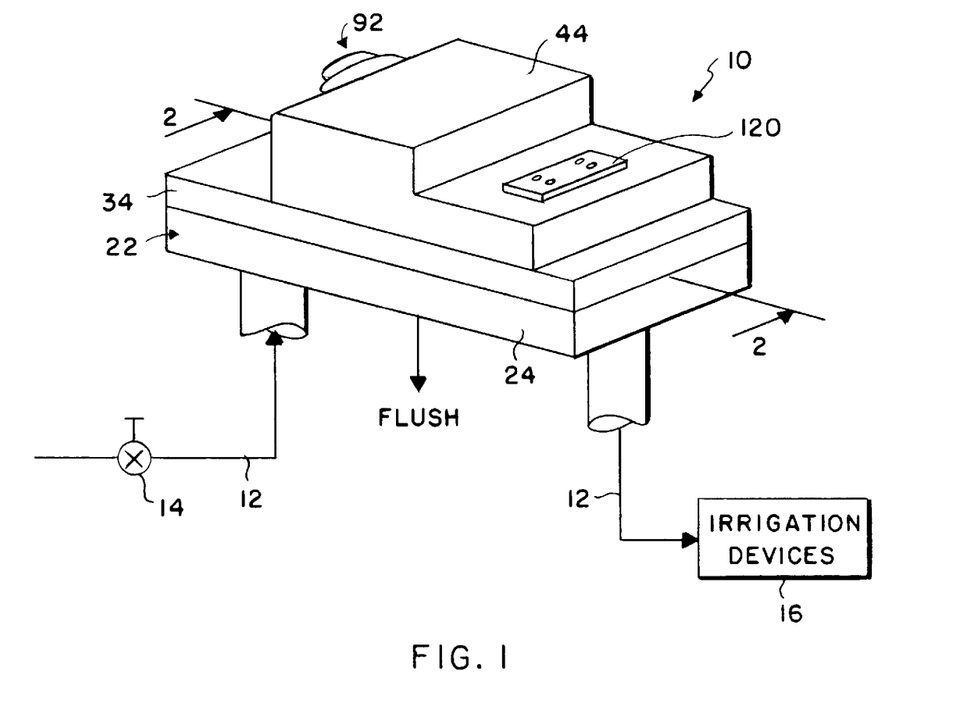
FIG. 1 is a somewhat schematic perspective view illustrating a self-cleaning water filter constructed in accordance with the invention.
Figure 5:
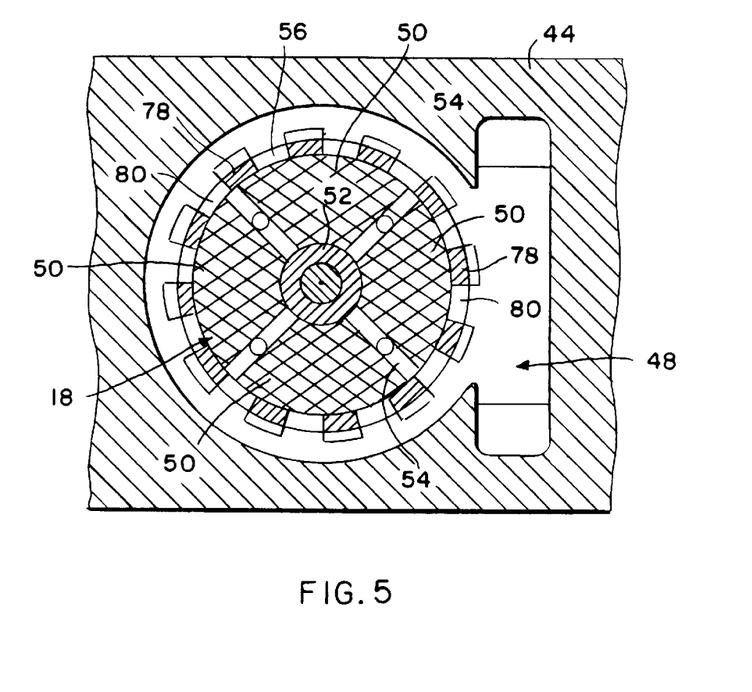
FIG. 5 is a fragmented horizontal sectional view taken generally on the line 5—5 of FIG. 2.

As shown in the exemplary drawings, an improved self-cleaning filter referred to generally in FIG. 1 by the reference numeral 10 is provided for filtering particulate matter from a fluid flow stream or the like. FIG. 1 illustrates the filter 10 utilized in an irrigation system wherein the filter is installed in-line along a water supply conduit 12 at a location downstream from a main system on-off control valve 14, to filter water supplied to a plurality of irrigation devices such as sprinkler heads or drip irrigation emitters referred to generally by reference numeral 16. In accordance with the invention, the improved self-cleaning filter 10 includes a segmented filter element 18 (FIGS. 2 and 5) which is automatically backwashed or flushed clean in response to operation of the control valve 14 for cyclic on-off supply of water.

The self-cleaning filter 10 of the present invention is designed to collect small particulate and fine debris present in the water supply, to prevent such particulate matter from flowing to the irrigation devices 16 and thereby avoid potential clogging and related undesired interference with the delivery of irrigation water to surrounding vegetation. The segmented filter element 18 is controllably positioned within the filter 10 by a pressure responsive index mechanism 20 to orient at least one filter segment for filtering incoming water, and at least one other filter segment for backwash flushing during an initial pressure rise transition period when the control valve 14 is turned on. Following this pressure rise transition period, filtered water is supplied to the irrigation devices 16 until the control valve 14 is turned off, at which time the index mechanism 20 responds to decreased pressure within the filter to index the filter element 18 so that the just-used filter segment is positioned for backwash flushing and a clean filter segment is positioned for filtering incoming water the next time the control valve 14 is turned on. This control valve 14 may, of course, be manually or automatically opened and closed to turn the water supply on and off. Moreover, while the self-cleaning filter 10 of the present invention is shown and described herein for use in an irrigation system, it will be recognized and understood that the filter may be employed in a wide variety of water and other fluid handling systems designed for cyclic on-off operation and wherein particulate filtering is desired.

Figure 2:
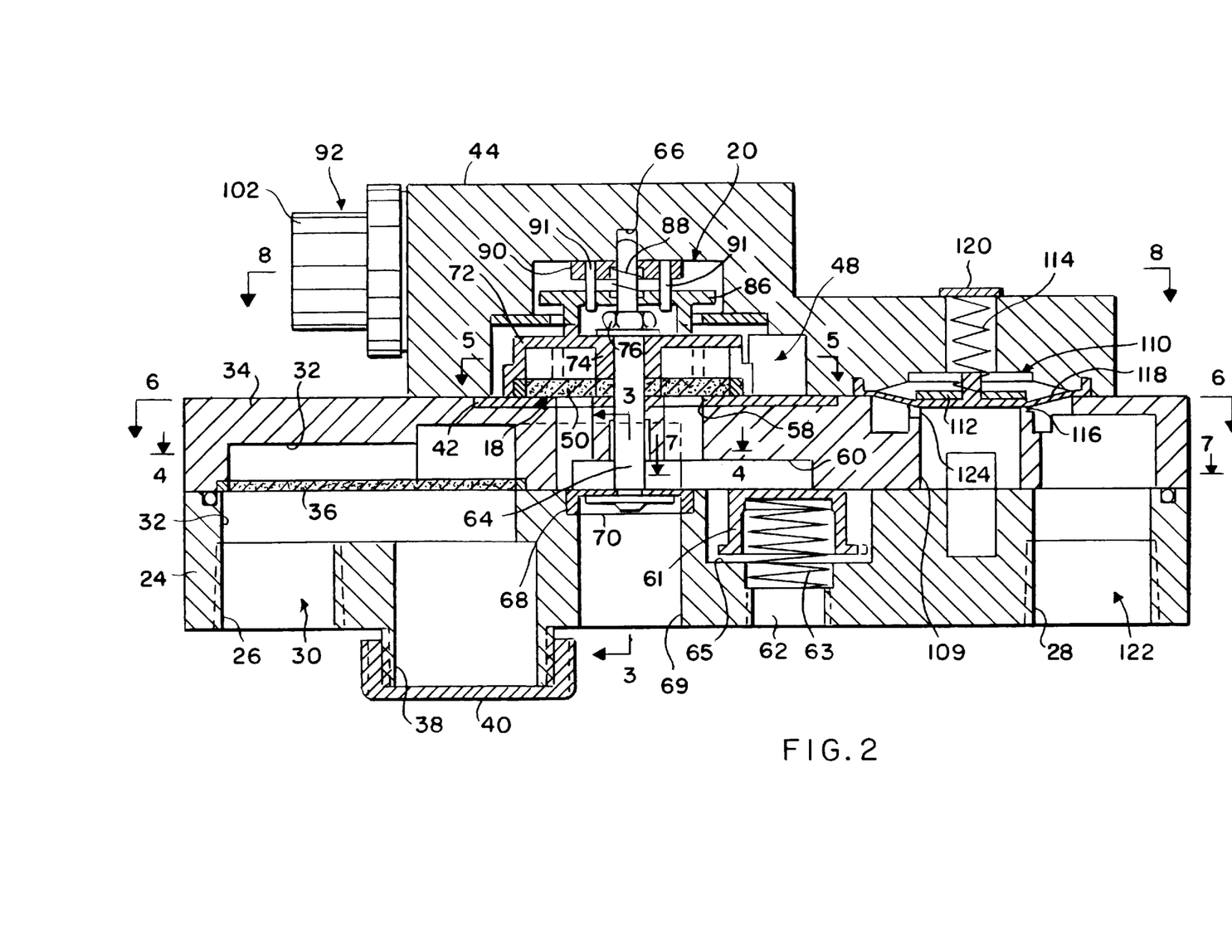
FIG. 2 is an enlarged longitudinal vertical sectional view taken generally on the line 2—2 of FIG. 1.
Figure 4:
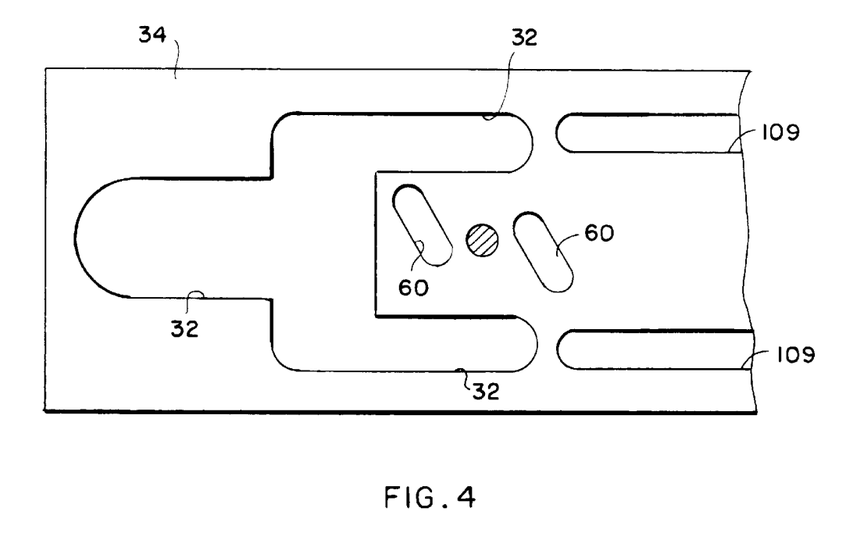
FIG. 4 is a fragmented horizontal sectional view taken generally on the line 4—4 of FIG. 2.

With reference to FIGS. 1 and 2, the illustrative filter 10 generally comprises a compact filter housing 22 formed by an assembled plurality of housing members which may be constructed from molded plastic and adapted for secure interconnection by appropriate fastener means (not shown) such as screws or the like. More particularly, in the preferred embodiment as shown, the housing 22 comprises an elongated base 24 defining a downwardly open inlet fitting 26 and a downwardly open outlet fitting 28 generally at opposite ends thereof for respective connection in-line with the water supply conduit 12 at a selected position downstream from the control valve 14. The inlet fitting 26 defines an open inflow port 30 for inflow of water to the filter 10 when the control valve 14 is turned on. As shown in FIGS. 2 and 4, the inflow port 30 communicated with an inlet passage 32 extending through the base 24, and further through a portion of a central housing member 34 mounted thereon for water flow to the filter element 18, as will be described in more detail. A coarse mesh screen 36 is captured between the base 24 and the central housing member 34 to extend across this inlet passage 32 for collecting relatively large water-entrained debris that could otherwise potentially interfere with the desired index operation of the filter element 18. In a typical irrigation system installation, this coarse mesh screen 36 will require infrequent cleaning, and a drain port 38 is normally closed by a cap or plug 40 that can be manually removed to permit flush-cleaning of the upstream side of the screen 36 when required.

Figure 3:
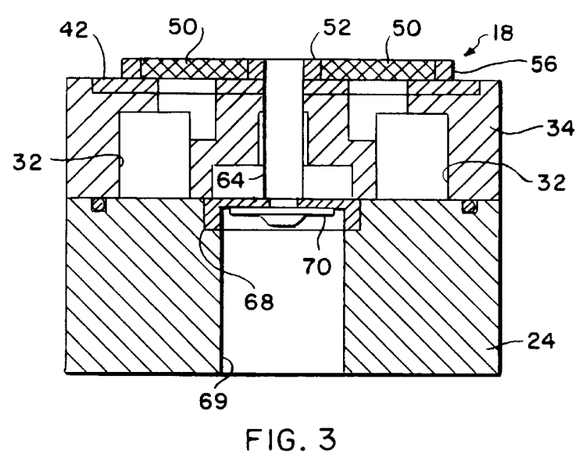
FIG. 3 is a transverse vertical sectional view taken generally on the line 3—3 of FIG. 2.
Figure 6:
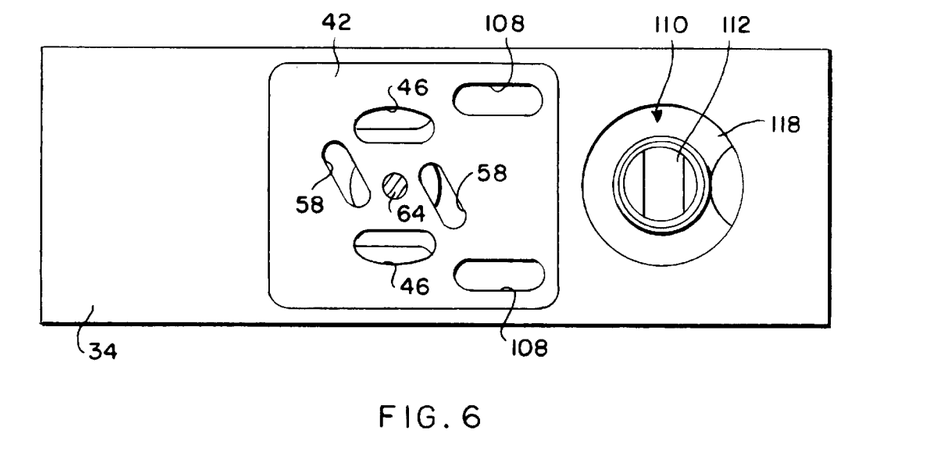
FIG. 6 is a horizontal sectional view taken generally on the line 6—6 of FIG. 2.

From the coarse mesh screen 36, the inlet passage 32 is shown to have a generally U-shaped configuration defining a split pair of downstream passage sections or branches extending through the central housing member 34 (FIG. 4) to the underside of a ported valve plate 42 sandwiched between an upper surface of the housing member 34 and an upper housing member 44 mounted thereon. The ported valve plate 42 defines a pair of inlet ports 46 (FIG. 6) disposed in open communication respectively with the split-apart downstream branches of the U-shaped inlet passage 32 for upward water flow into a filter chamber 48 (FIG. 2) formed within the upper housing member 44. Importantly, the filter element 18 is supported and retained by the index mechanism 20 within the filter chamber 48 in sliding abutting contact with the upper surface of the valve plate 42, with a pair of filter segments 50 aligned with the inlet ports 46 (FIG. 3). Accordingly, water passing upwardly from the inlet passage 32 through the inlet ports 46 in the valve plate 42 is filtered by the filter segments 50 aligned with the inlet ports, whereby particulate entrained within the water flow is collected on the lower or upstream faces of the filter segments.

The filter element 18 comprises a filter disk of generally circular shape. More particularly, as shown best in FIGS. 3 and 5 in accordance with one preferred construction, this filter disk includes a porous filter screen of selected fine mesh size supported by a frame of molded plastic or the like to include a central hub 52 joined by a plurality of outwardly radiating spokes 54 to an outer peripheral rim 56. Accordingly, the frame spokes 54 and rim 56 subdivide the filter screen into the plurality of filter segments 50 formed in a radially extending array. In the preferred form as depicted in the illustrative drawings, four spokes 54 are provided to subdivide the fine mesh filter screen into a plurality of four filter segments 50 each having an arcuate span of about 90°. A diametrically opposed pair of these filter segments 50 are aligned with the inlet ports 46 for filtering water flowing therethrough into the filter chamber 48. The remaining diametrically opposed pair of filter segments 50 are aligned respectively over a pair of flush ports 58 formed in the valve plate 42 (FIGS. 2 and 6) which communicate downwardly through a pair of split upstream sections of a flush passage 60 formed in the central housing member 34 and further to a flush outlet 62 in the base 24. A flush valve 61 (FIG. 2) is mounted at the flush outlet 62 and is retained in a normally open position by a spring 63 to permit water flow through the flush outlet 62 to a waste or drain site at the exterior of the filter housing 22.

Figure 10:
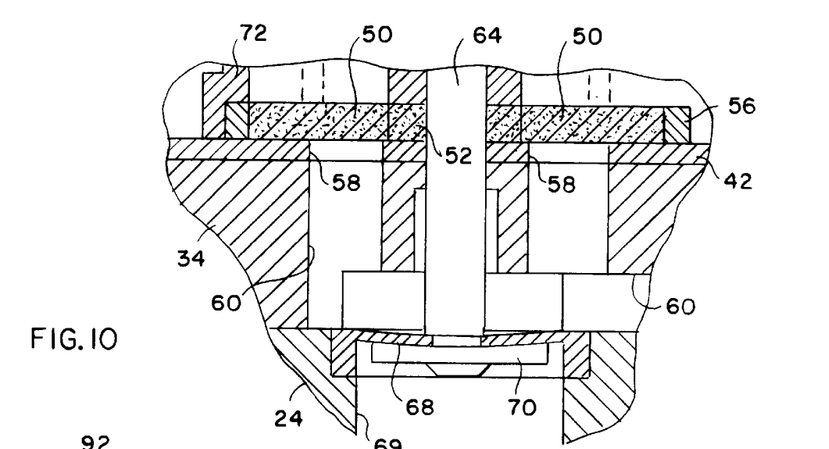
FIG. 10 is a fragmented longitudinal vertical sectional view similar to a portion of FIG. 2, and showing a filter element in a clamped position.

The filter element 18 is supported within the filter chamber 48 with the hub 52 rotatably carried on a support shaft 64. In this regard, an upper end of the support shaft 64 is seated within a bearing bore 66 formed in the upper housing member 44, and a lower end of the support shaft extends through a resilient retention ring 68 which is captured between the base 24 and the central housing member 34. As shown in FIGS. 2 and 10, the lower end of the support shaft 64 is axially secured to the retention ring 68 as by capturing an inwardly directed flange of the ring 68 within a shallow groove defined between an axially presented shoulder and a radially enlarged washer 70 on the support shaft 64. With this construction, the support shaft 64 is free to undergo a limited range of axial displacement according to the resilient characteristics of the retention ring 68, for releasibly clamping the filter element 18 against the valve plate 42 as will be described in more detail.

Figure 9:
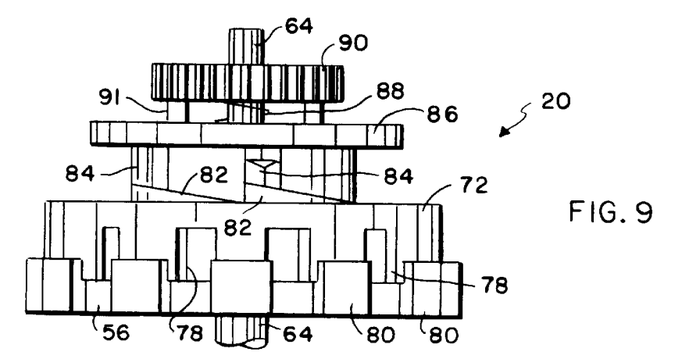
FIG. 9 is a fragmented elevation view depicting components of an index mechanism for rotation of a filter element.

The index mechanism 20 comprises a generally cup-shaped filter holder 72 which is also rotatably carried on the support shaft 64 in an inverted orientation, with a central mounting sleeve 74 retained axially between the hub 52 of the filter element 18 and a nut 76 threaded onto the support shaft. The filter holder 72 defines an outer or peripheral wall in the form of a plurality of downwardly extending drive fingers 78 sized and shaped for interlocking engagement with a plurality of outwardly radiating drive lugs 80 on the outer rim 56 of the filter element (FIG. 9). Accordingly, rotational movement of the filter holder 72 about the support shaft 64 results in a corresponding rotational movement of the filter element 18 relative to the underlying inlet ports 46 and the flush ports 58.

The index mechanism 20 comprises a one-way clutch for unidirectional driving of the filter element 18. More particularly, a plurality of ramped ratchet teeth 82 (FIGS. 2 and 9) are formed on an upper surface of the filter holder 72 for rotary drive engagement with a matingly shaped plurality of clutch teeth 84 depending from a lower surface of a clutch plate 86. This clutch plate 86 is also rotatably carried on the support shaft 64. However, the clutch plate 86 also slides axially on the support shaft 64, and a biasing spring 88 reacts between an upper surface of the clutch plate 86 and an underside surface of a drive gear 90 to normally urge the clutch plate teeth 84 downwardly for engaging the ratchet teeth 82 on the filter holder 72. A plurality of drive pins 91 extend downwardly from the drive gear 90 for slide-fit reception through open ports in the clutch plate 86 (FIG. 2), whereby rotational motion of the drive gear 90 is transmitted to the clutch plate. The drive gear 90 is coupled in turn with a pressure responsive actuator 92 (FIG. 8) for unidirectionally rotating the clutch plate 86 in a manner to index the filter holder 72 and the filter element 18 carried thereby relative to the inlet and flush ports 46 and 58 formed in the valve plate 42.

Figure 8:
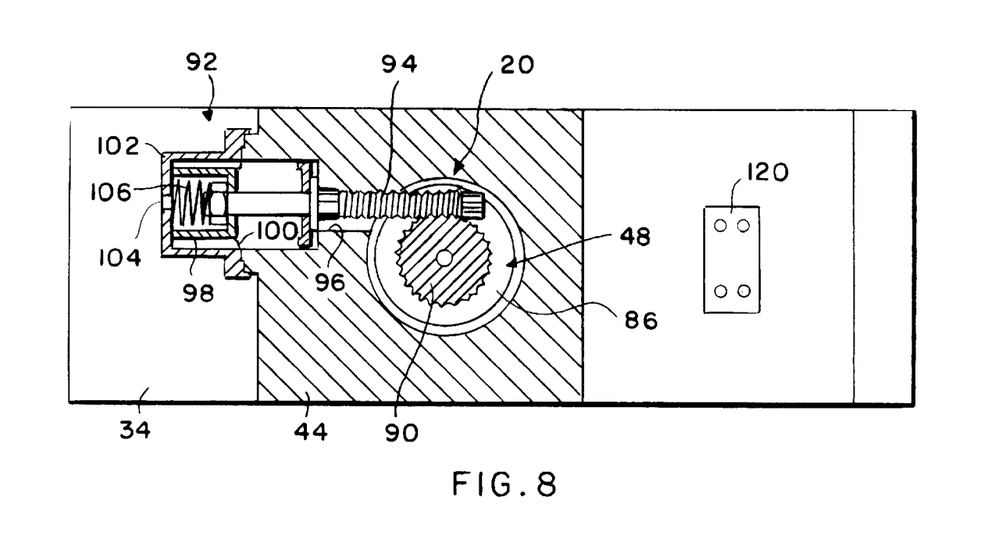
FIG. 8 is a horizontal sectional view taken generally on the line 8—8 of FIG. 2.

More specifically, the pressure responsive actuator 92 (FIG. 8) comprises a drive rack pin 94 carried within the upper housing member 44 for axial sliding movement within an elongated bore 96. One side of this bore 96 is exposed to the filter chamber 48, to permit meshed coupling of the pin 94 with the drive gear 90 for rotating the drive gear back and forth in response to axial reciprocation of the pin 94 within the bore 96. To effect this motion, one end of the pin 94 is secured to a piston head 98 which is coupled in turn to a resilient diaphragm 100 captured between an exterior surface of the upper housing member 44 and a cup-shaped cap 102 attached to the housing member 44. Sufficient clearance is provided between the pin 94 and the bore 96 to communicate fluid pressure within the filter chamber 48 to an inboard side of the diaphragm 100, whereas an outboard side of the diaphragm 100 is exposed to atmosphere through a small vent 104 in the cap 102 (FIG. 8). A biasing spring 106 reacts between the cap 102 and the piston head 98 to normally urge or advance the drive rack pin 94 axially inwardly toward the drive gear 90.

In use, when water is supplied to the filter 10, the pressure within the filter chamber 48 will rise ultimately to a pressure level sufficient to retract the piston head 98 of the actuator 92 in an outboard direction relative to the drive gear 90. When this occurs, the drive rack pin 94 rotatably drives the gear 90 through an angular or arcuate increment of about 90°, until the piston head 98 bottoms against the actuator cap 102 as viewed in FIG. 8. In this regard, the size and shape of the actuator cap 102 and the related piston head 98 are selected to achieve an arcuate rotation of the drive gear 90 of about 90°. Importantly, such rotation correspondingly rotates the clutch plate 86, but the inclined shapes of the clutch teeth 84 and the ratchet teeth 82 are such that the clutch plate is axially retracted from the filter holder 72 against the spring 88 as the clutch teeth 84 ride over the ratchet teeth 82 on the filter holder. Conveniently, water pressure within the filter chamber 48 is also supplied to the flush passage 60 and hence to the top of the resilient retention ring 68. Since the bottom of the retention ring 68 is exposed to atmosphere via an aperture 69 in the base 24, a central diaphragm segment of the ring 68 is deformed downwardly and by (FIG. 10) and thereby pulls the support shaft 64, the nut 76, and the filter holder 72 downward clamping the filter element 18 against the valve plate 42 to prevent movement of the filter element and leakage of particulate around the filter element.

Figure 11:
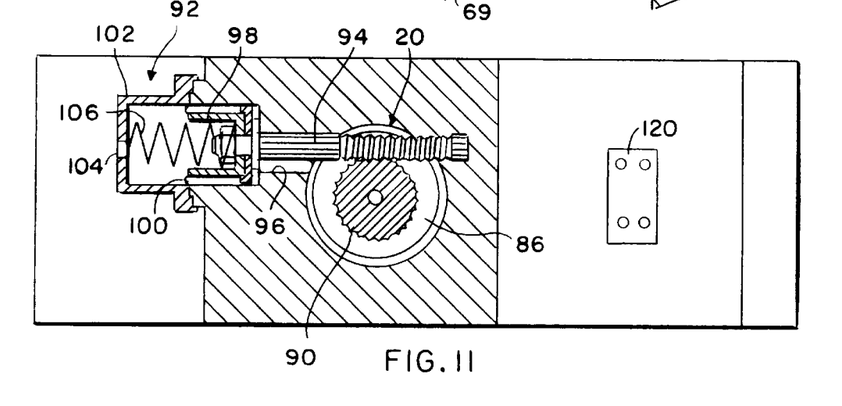
FIG. 11 is a horizontal sectional view similar to FIG. 8, but depicting an index mechanism in an advanced position.

However, when the water supply is subsequently turned off and the water pressure is relieved within the filter chamber 48, the biasing spring 106 of the pressure responsive actuator 92 causes the drive rack pin 94 to translate in an opposite direction (FIG. 11), axially advancing into the bore 96 to drive the gear 90 through an equal rotational increment in an opposite rotational direction. When this occurs, the clutch plate 86 is also rotated through the same directional increment, but this time the clutch teeth 84 engage and drive the ratchet teeth 82 on the filter holder 72 to rotate the filter element 18 through a rotational increment of about 90°. Such rotation re-positions the filter segments 50 to reverse their alignment relative to the inlet ports 46 and the flush ports 58. In other words, the pair of filter segments previously aligned with the inlet ports 46 are rotated into alignment with the flush ports 58, and vice versa.

Figure 7:
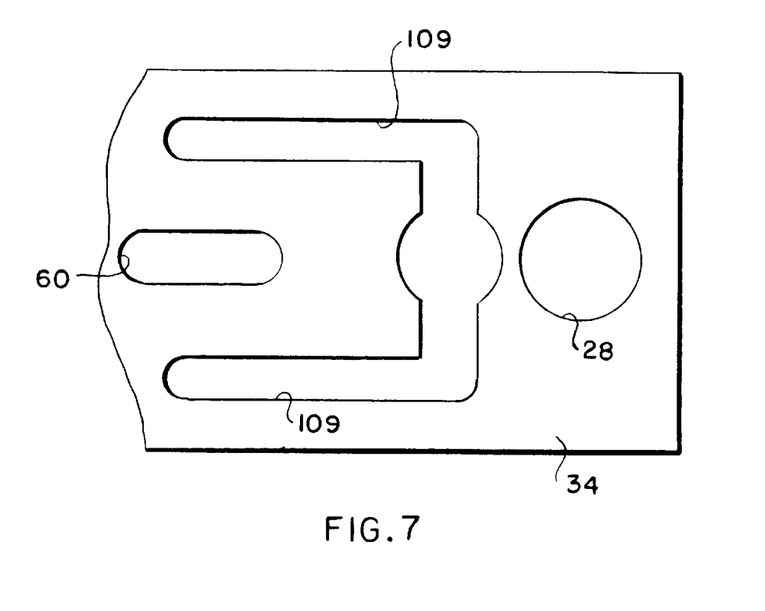
FIG. 7 is a fragmented horizontal sectional view taken generally on the line 7—7 of FIG. 2.

The filter chamber 48 also communicates via an additional pair of outlet ports 108 (FIG. 6) formed in the valve plate 42 with an outlet passage 109 (FIG. 7) extending through the central housing member 34 toward the outlet fitting 28. An outlet valve 110 (FIG. 2) is mounted along this passage 109 and comprises a valve member 112 biased by a spring 114 to a normally closed position on a valve seat 116. As shown in FIG. 2, the valve member 112 is carried by a diaphragm 118, with the spring 114 reacting between one side of the valve member 112 and a vented support bracket 120 mounted on the upper housing member 44. When water pressure within the filter chamber 48 rises to a sufficient pressure level, the outlet valve 110 is opened to permit flow of filtered water to and through the outlet fitting which defines an outflow port 122 in flow communication with the water supply conduit 12.

In operation, when the control valve 14 is turned on, water flows to the filter 10 through the inlet fitting 26 and inlet passage 32 and further through the filter segments 50 aligned with the inlet ports 46 to the filter chamber 48. Initially, water within the filter chamber 48 passes further through the other filter segments 50 aligned with the flush ports 58 to backwash particulate previously collected on those filter segments. Specifically, the water from the filter chamber 48 backwashes through the filter segments aligned with the flush ports 58 and flushes the backwashed particulate from the filter past the flush valve 61 and through the flush outlet 62. This backwash flush flow rate is determined by the condition of the filter segments being backwashed. If the filter segments are substantially clogged with particulate, the initial flow rate will be low but will increase as the filter segmented are cleaned. The pressure in the flush passage 60 is controlled in turn by the flow rate past the flush valve 61, wherein the flush valve 61 and the associated spring 63 are designed so that the pressure at the upstream side of the flush valve 61 will overcome the force applied by the spring 63 to close the flush valve against a seat 65 (FIG. 2) when the flow through the filter segments being backwashed is high enough to reflect an acceptable state of backwash cleaning.

After the flush valve 61 is closed in response to increasing pressure, the water pressure within the filter chamber 48 rapidly increases to line pressure. As this occurs, the actuator 92 is pressure-operated for retraction of the drive rack pin 94 to back-rotate the clutch plate 86 through a 90° rotational increment without a corresponding rotation of the filter element 18. At the same time, the water pressure increases to a higher second predetermined pressure level sufficient to open the outlet valve 110 for flow of filtered water to the irrigation devices 16.

When the control valve 14 is turned off, water flow to the filter 10 is interrupted and the water pressure within the filter chamber 48 is relieved. In this regard, a bleed notch 124 (FIG. 2) may be provided in the outlet valve seat 116 to insure that the pressure within the filter chamber 48 will decrease substantially to atmospheric pressure when the control valve 14 is turned off. As the pressure in the chamber 48 drops, the outlet valve 110 closes followed by re-opening of the flush valve 61. In addition, the actuator 92 spring-advances the drive rack pin 94 to rotate the clutch plate 86 through a forward-drive increment of 90°, resulting in index rotation of the filter element 18 through a rotational step of 90°. As previously described, this rotational indexing of the filter element 18 reverses the positions of the filter segments 50 relative to the inlet ports 46 and the flush ports 58. Specifically, the filter segments previously aligned with the inlet ports 46 for filtration are indexed into alignment with the flush ports 58 for backwashing when the control valve 14 is next turned on. Conversely, the filter segments previously aligned with the flush ports 58 for backwashing are aligned with the inlet ports 46 for filtration the next time the control valve 14 is turned on.

The improved self-cleaning filter 10 of the present invention thus provides filtered water through the outlet fitting 28 to the irrigation devices 16 or other selected water usage site. When the main control valve 14 is turned on, the filter initially backwashes or flushes one or more previously used filter segments during an initial brief transition pressure rise period, for a time period sufficient to properly clean the filter segments, and thereafter supplies filtered water through the outlet fitting. The pressure responsive actuator 92 also responds to water pressure to reset the index mechanism 20 for index rotation of the filter element 18 when the control valve 14 is turned off. With this arrangement, clean filter segments are available for filtering incoming water, and previously used filter segments are backwashed, each time the control valve is turned on.

A variety of further modifications and improvements in and to the improved filter of the present invention will be apparent to those persons skilled in the art. For example, while the filter element 18 has been shown and described in the form of a single filter disk subdivided by the spoked frame into multiple filter segments, it will be recognized and understood that these filter segments may comprise a plurality of individual filter members carried by a common frame for movement along a selected index path of nonlinear or linear shape into appropriate alignment with an inlet port 46 and a flush port 58. In the circular filter element configuration as shown, it will be further recognized and understood that any selected number of multiple filter segments may be used, with appropriate incremental rotation. Moreover, in some designs, a single flush port 58 may be provided for alignment with a single filter segment, with the remaining filter segments aligned with associated inlet ports 46, whereby each filter segment may be used for two or more filter cycles in succession prior to displacement into alignment with the flush port 58 for a flush cycle. Accordingly, no limitation on the invention is intended by way of the foregoing description and accompanying drawings, except as set forth in the appended claims.

What is claimed is:

1. A self-cleaning filter for connection to a fluid supply conduit having a control valve for turning the fluid supply on and off, said filter comprising:

a filter housing having a filter chamber formed therein, means defining at least one inlet port for flow of fluid from the fluid supply conduit to said filter chamber, means defining at least one flush port for flow of fluid from said filter chamber, and means defining at least one outlet port for flow of fluid from said filter chamber;

a filter element mounted within said filter chamber and including a plurality of filter segments, at least one of said filter segments being aligned with said inlet port for filtering fluid flowing from the fluid supply conduit to said filter chamber, and at least one other of said filter segments being aligned with said flush port for backwash flow of fluid therethrough from said filter chamber through said flush port;

a flush valve normally open to permit fluid flow through said flush port and including pressure responsive means for closing said flush port when the pressure within said filter chamber reaches a first predetermined pressure level;

an outlet valve normally closed to prevent fluid flow through said outlet port and including pressure responsive means for opening said outlet port when the pressure within said filter chamber reaches a second predetermined pressure level higher than said first predetermined pressure level, whereby fluid supplied to said filter chamber when the fluid supply is turned on flows initially with increasing pressure through said flush port to backwash said other filter segment until the pressure increases sufficiently to close said flush valve, whereupon further pressure increase within said filter chamber opens said outlet valve to permit fluid flow from said filter chamber through said outlet port; and a pressure responsive index mechanism for indexing said filter segments relative to said inlet and flush ports in response to cyclic operation of the control valve to turn the fluid supply on and off.

2. The self-cleaning filter of claim 1 wherein said filter housing further includes an inlet fitting adapted for connection to the fluid supply conduit at a location downstream from the control valve, and an inlet passage communicating said inlet fitting with said at least one inlet port.

3. The self-cleaning filter of claim 2 further including a coarse mesh filter mounted along said inlet passage, said filter housing further defining a drain port communicating with an upstream side of said coarse mesh filter, and further including means for removably closing said drain port.

4. The self-cleaning filter of claim 2 wherein said inlet passage defines a pair of split downstream passage sections terminating in flow communication with a corresponding pair of said inlet ports.

5. The self-cleaning filter of claim 1 wherein said filter housing further includes an outlet fitting adapted for connection to the fluid supply conduit, and an outlet passage communicating said outlet fitting with said at least one outlet port.

6. The self-cleaning filter of claim 5 wherein said outlet valve is mounted along said outlet passage.

7. The self-cleaning filter of claim 1 further including bleed means for relieving fluid pressure within said filter chamber when the fluid supply is turned off.

8. The self-cleaning filter of claim 1 wherein said filter housing further defines a flush passage communicating said at least one flush port with the exterior of said filter housing.

9. The self-cleaning filter of claim 8 wherein said flush valve is mounted along said flush passage.

10. The self-cleaning filter of claim 8 wherein said flush passage defines a pair of split upstream passage sections in flow communication with a corresponding pair of said flush ports.

11. The self-cleaning filter of claim 1 wherein said filter element comprises a filter disk having said plurality of filter segments formed thereon in a radially extending array.

12. The self-cleaning filter of claim 11 wherein said index mechanism comprises means for rotatably supporting said filter disk relative to said inlet and flush ports, a one-way clutch for incremental rotational driving of said filter disk in one direction, and a pressure responsive actuator for driving said filter disk through a rotational increment each time the fluid supply is turned off.

13. The self-cleaning filter of claim 12 wherein said actuator is responsive to relieving of pressure within said filter chamber to drive said filter disk through a rotational increment.

14. The self-cleaning filter of claim 12 wherein said filter housing includes a ported valve plate mounted at one side of said filter chamber and having said inlet and flush ports formed therein, said index mechanism further including means responsive to fluid pressure within said filter chamber for clamping said filter disk against said valve plate.

15. A self-cleaning filter for connection to a water supply conduit having a control valve adapted to be opened and closed for respectively turning the water supply on and off, said filter comprising:

a filter housing having a filter chamber formed therein, an inlet fitting adapted for connection to the water supply conduit at a location downstream from the control valve, and at least one inlet passage extending from said inlet fitting and terminating in at least one inlet port for flow of water from the water supply conduit to said filter chamber;

said filter housing further including at least one flush port for flow of water from said filter chamber and through at least one flush passage to the exterior of said filter housing, and at least one outlet port for flow of water from said filter chamber and through at least one outlet passage to an outlet fitting adapted for connection to the water supply conduit;

a filter element mounted within said filter chamber and including at least one first filter segment aligned with said inlet port for filtering water flowing to said filter chamber when the water supply is turned on, and at least one second filter segment aligned with said flush port for backwash flow of water therethrough from said filter chamber and through said flush passage;

a normally open flush valve mounted along said flush passage to permit said backwash flow of water through said second filter segment when the water supply is initially turned on, said flush valve including pressure responsive means for closing said flush passage when the pressure within said filter chamber reaches a first predetermined pressure level;

a normally closed outlet valve mounted along said outlet passage to prevent water flow to said outlet fitting while said flush valve is open, said outlet valve including pressure responsive means for opening said outlet passage when the pressure within said filter chamber reaches a second predetermined pressure level higher than said first predetermined pressure level; and a pressure responsive index mechanism for indexing said first and second filter segments relative to said inlet and flush ports in response to cyclic operation of the control valve to turn the water supply on and off, said index mechanism comprising means for rotatably supporting said filter element relative to said inlet and flush ports, a one-way clutch for incremental rotational driving of said filter element in one direction, and a pressure responsive actuator for driving said filter element through a rotational increment each time the water supply is turned off.

16. The self-cleaning filter of claim 15 further including a coarse mesh filter mounted along said inlet passage, said filter housing further defining a drain port communicating with an upstream side of said coarse mesh filter, and further including means for removably closing said drain port.

17. The self-cleaning filter of claim 15 wherein said inlet passage defines a pair of split downstream passage sections terminating in flow communication with a corresponding pair of said inlet ports, said filter element including a pair of said first segments aligned with said pair of inlet ports.

18. The self-cleaning filter of claim 15 further including bleed means for relieving water pressure within said filter chamber when the water supply is turned off.

19. The self-cleaning filter of claim 18 wherein said outlet valve comprises a valve head normally closed upon a valve seat, said bleed means comprising a bleed notch formed in said valve seat.

20. The self-cleaning filter of claim 15 wherein said flush passage defines a pair of split upstream passage sections in flow communication with a corresponding pair of said flush ports, said filter element including a pair of said second filter segments aligned with said pair of flush ports.

21. The self-cleaning filter of claim 15 wherein said filter element comprises a filter disk having said plurality of filter segments formed thereon in a radially extending array.

22. The self-cleaning filter of claim 15 wherein said actuator is responsive to relieving of pressure within said filter chamber to drive said filter disk through a rotational increment.

23. The self-cleaning filter of claim 22 wherein said filter housing includes a ported valve plate mounted at one side of said filter chamber and having said inlet and flush ports formed therein, said index mechanism further including means responsive to water pressure within said filter chamber for clamping said filter disk against said valve plate.

24. The self-cleaning filter of claim 15 wherein said index mechanism rotatably indexes said filter element to reverse the positions of said first and second filter segments relative to said inlet and flush ports each time the water supply is turned off.

25. The self-cleaning filter of claim 24 wherein said filter element comprises a filter disk having a pair of radially extending and diametrically opposed first filter segments, and a pair of radially extending and diametrically opposed second filter segments, said filter housing defining a pair of said inlet ports for alignment with said first filter segments and a pair of said outlet ports for alignment with said second filter segments.

26. The self-cleaning filter of claim 15 wherein said index mechanism is mounted within said filter chamber.

* * * * *